UNITED STATES PATENT OFFICE.

WILLIAM JOUNGSTER, OF HAWTHORNE, NEW JERSEY.

METHOD OF MANUFACTURING A BUTTER SUBSTITUTE.

1,261,820.   Specification of Letters Patent.   Patented Apr. 9, 1918.

No Drawing.   Application filed February 18, 1918.   Serial No. 217,931.

*To all whom it may concern:*

Be it known that I, WILLIAM JOUNGSTER, a subject of the Queen of Holland, residing at Hawthorne, in the county of Bergen and State of New Jersey, have invented certain new and useful Improvements in Methods of Manufacturing a Butter Substitute, of which the following is a specification.

This invention consists in a novel method of compounding certain edible substances with butter whereby to produce a butter product in increased amount which shall be a good substitute for ordinary butter for table use.

In carrying out my invention I take for every five pounds of butter, preferably good creamery butter, used, five pounds of wheat flour, ten quarts of milk and one and one-fourth pounds of salt for seasoning, and boil the mixture comprising these ingredients for three minutes, meanwhile stirring the same to prevent burning, to insure against the flour lumping and generally to establish and maintain as perfect a state of homogeneity as possible.

If a salted butter product is not desired, the salt may be omitted.

After the mixture has boiled the period of time stated it is allowed to cool for about three minutes whereupon ten whole eggs (yokes and whites), already thoroughly beaten together, are introduced into and well stirred in the mixture. The stated period of time allowed for the boiled mixture to cool before adding thereto the beaten eggs may be somewhat more or less than three minutes, but in any event it should be sufficient so that the heat remaining in the mixture will not cause coagulation and an undesirable consequent hardening of the eggs, which would of course prevent the desired homogeneous mixing thereof with the boiled mixture.

The resultant product will have substantially the same consistency and taste as good butter and will weigh about thirty pounds.

The cooking of the flour, milk and butter serves in part to convert the raw milk to a state of such preservation that the resultant product will keep substantially the same as ordinary butter; it produces the smoothness and homogeneity necessary to insure simulation of the product to real butter, in particular preventing the flour from precipitating and thus separating from the other ingredients; and it converts the flour to a better condition as an aliment.

The presence of the whole eggs in the product brings up its color to that of real butter and supplies an otherwise absent food value, together with a certain necessary stability, stiffness and viscosity.

The improved butter is neither intended nor well adapted for cooking purposes because of the relatively large proportion of the non-fat substance—flour—present therein, but used on bread or for similar table purposes it is an excellent substitute for real butter.

I claim:

The herein described method of manufacturing a butter substitute which consists in boiling for about three minutes a mixture of the following ingredients in about the proportions stated, to wit, butter—5 lbs., flour—5 lbs., milk—10 qts.; then allowing the mixture to cool for about three minutes and then mixing therewith the beaten whites and yolks of approximately 10 eggs.

In testimony whereof I affix my signature.

WILLIAM JOUNGSTER.

Copies of this patent may be obtained for five cents each, by addressing the "Commissioner of Patents, Washington, D. C."